United States Patent [19]

Sedelmayer

[11] 4,249,851

[45] Feb. 10, 1981

[54] TRANSPORTER VEHICLE FOR VEHICLES AND CONTAINERS

[75] Inventors: Franz X. Sedelmayer; Ferenc Juhasz both of Munich, Fed. Rep. of Germany

[73] Assignee: Franz X. Sedelmayer, Munich, Fed. Rep. of Germany

[21] Appl. No.: 940,124

[22] Filed: Sep. 6, 1978

[30] Foreign Application Priority Data

May 12, 1978 [DE] Fed. Rep. of Germany ....... 2820919

[51] Int. Cl.$^3$ ............................................... B60P 1/04
[52] U.S. Cl. ................................... 414/494; 414/469; 414/480; 414/538; 414/559
[58] Field of Search ......................... 414/469, 474–485, 414/491, 494, 538, 559

[56] References Cited

U.S. PATENT DOCUMENTS

| 2,998,890 | 9/1961 | Schwartz | 414/469 |
| 3,035,728 | 5/1962 | Hecker | 414/494 |
| 3,467,268 | 9/1969 | Corompt | 414/494 |
| 3,712,491 | 1/1973 | Kreutzer | 414/494 |
| 4,067,470 | 1/1978 | Felburn | 414/469 |
| 4,081,094 | 3/1978 | Pereira et al. | 414/491 |

FOREIGN PATENT DOCUMENTS

| 1939378 | 3/1971 | Fed. Rep. of Germany | 414/469 |
| 1165660 | 10/1958 | France | 414/469 |
| 1250050 | 3/1970 | United Kingdom | 414/469 |
| 137403 | 4/1961 | U.S.S.R. | 414/469 |

Primary Examiner—Stephen G. Kunin
Assistant Examiner—R. B. Johnson
Attorney, Agent, or Firm—Oblon, Fisher, Spivak, McClelland & Maier

[57] ABSTRACT

A vehicle for transporting vehicles and/or containers, includes a driver cab and a rear axle. A loading platform is mounted on the vehicle and is movable between transportation and loading positions. The platform has front and rear sections. The rear section projects in a cantilevered fashion beyond the rear axle of the vehicle and adapted to be lowered to the ground for loading and unloading vehicles and/or containers. The rear section is bent downward with respect to the front section at an angle. A push-pull unit is mounted on the front section of the loading platform. A tipping support mechanism is mounted on the vehicle directly above the rear axle for pivotally supporting the platform. A tail wheel is mounted to the rear section of the platform. The rear section further includes a tiltable, drive on ramp upon which the vehicles and/or containers are moved during loading and unloading operations. A trailer coupling mechanism is directly connected to the tipping support mechanism. A stationary wheel box is mounted on the front section of the platform. The length of the loading platform from a middle portion of the stationary wheel box to the tipping support mechanism is approximately 2.1 m and the length from the tipping support mechanism to an end portion of the rear section is approximately 2.5 m.

9 Claims, 4 Drawing Figures

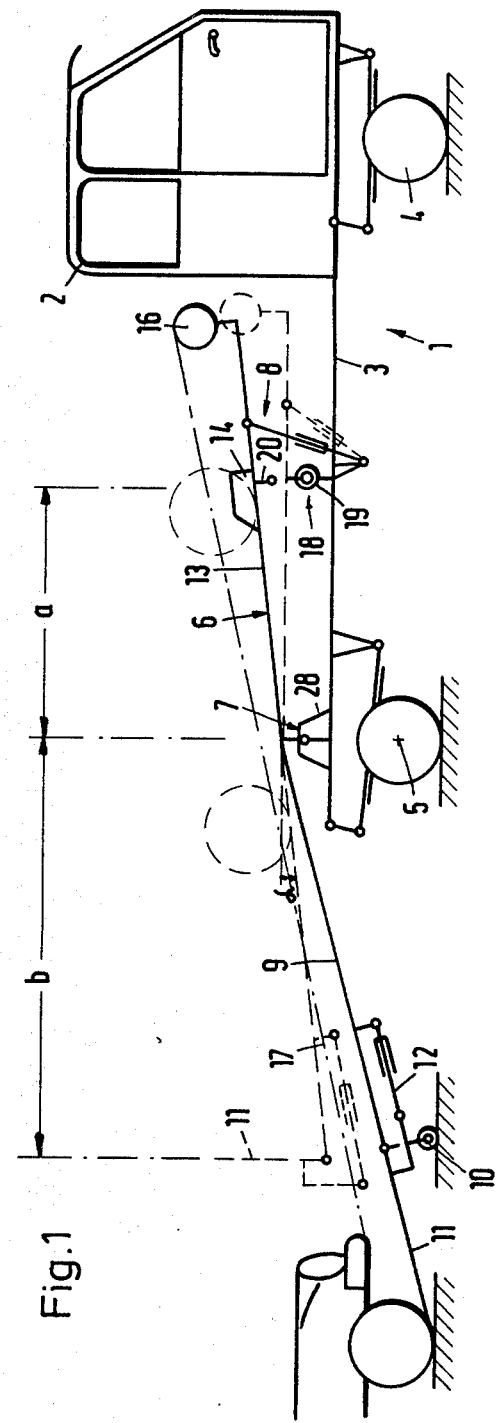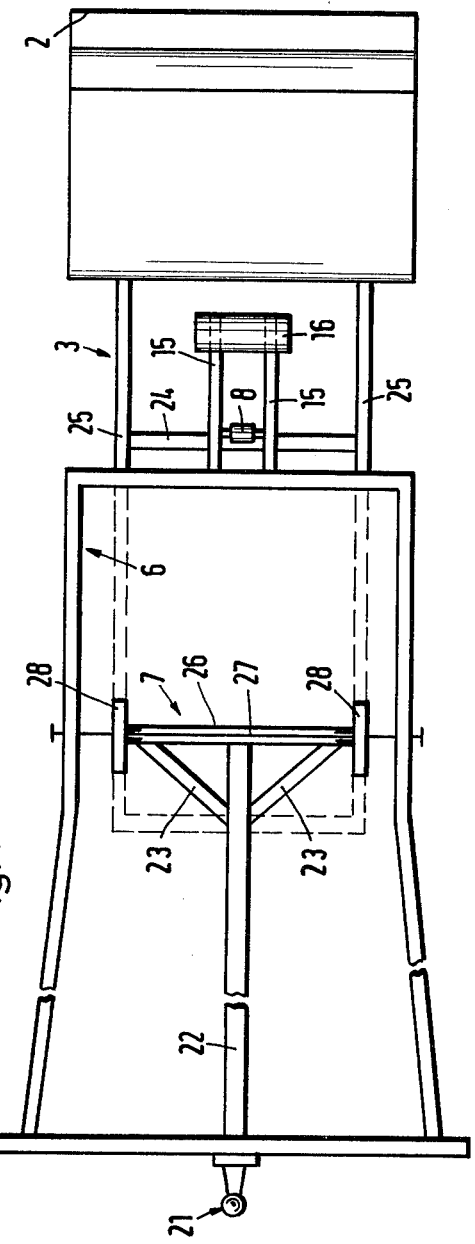

TRANSPORTER VEHICLE FOR VEHICLES AND CONTAINERS

BACKGROUND OF THE INVENTION

1. Field of the Invention

The instant invention relates to a transporter vehicle for vehicles and containers, in particular passenger cars, of the type including a loading platform behind the driver's cab and projecting in cantilever fashion with its rear section beyond the rear axle of the vehicle and adapted to be lowered to the ground for loading.

2. Description of the Prior Art

Known transporter vehicles of this kind have a loading platform which is displaced to the rear and lowered at the same time for loading purposes so that an inclined ramp is formed. When the vehicle has been pulled on to the platform, the latter must be tilted and drawn back on to the chassis by means of a winch disposed on the vehicle behind the driver's cab. The shifting of the loading platform, in particular pulling it up after loading requires considerable drive means and great structural expenditure and, furthermore, the resulting force ratios are very unfavorable, necessitating a relatively heavy chassis for the transporter vehicle. Moreover, a trailer cannot be attached to such a transporter vehicle since its load would have to be introduced directly into the chassis. This is not possible through the loading platform which is displaceable and juts out far to the rear.

SUMMARY OF THE INVENTION

It is, therefore, an object of the present invention to provide a transporter vehicle of the kind defined initially which permits simpler handling of the loading platform with smaller forces to be invested and, at the same time, affords favorable load distribution to the transporter vehicle.

This object is met, in accordance with the invention, in that the front section of the loading platform is supported behind the driver's cab by means of a push-pull unit and above the rear axle of the vehicle by means of a tipping support on the chassis of the vehicle, the rear section of the loading platform extending to the rear beyond the tipping support being bent downwards at an angle. Together with the bent down rear section of the loading platform the tipping support in accordance with the invention has the advantage that, on the one hand, a relatively small tipping angle is needed until the ground is touched and, on the other hand, with a vehicle on the loading platform all that is needed is tilting back. This requires only little force if care is taken that the center of gravity of the motor vehicle on the loading platform is located near the tipping support, preferably between the tipping support and the push-pull unit. The main load of the transporter vehicle thus acts on its rear axle and the service load for the front axle may be restricted to the maximum permissible value. Any relief of the front axle by tilting moments is thus avoided.

Convenient approach to a passenger car to be hauled away, with the loading platform tipped down, is warranted by the provision of tail wheels at the end of the platform. In addition a tiltable drive-on ramp may be provided to bridge the remaining difference in height between the upper edge of the loading platform and ground.

It is especially advantageous if the loading platform is not bent by more than 8° because then with respect to any of the goods to be transported, their bottom portion is prevented from sitting on the bend or knee.

Furthermore, the tipping support of the loading platform permits mounting of a trailer coupling at the loading platform and this trailer coupling is anchored directly at the tipping support, thus warranting load transfer onto the chassis of the transporter vehicle. As the push-pull unit has to exert only minor forces, approximately of the order of 200 to 700 kg., such may constitute either a simple spindle drive actuated by an electric motor and being self-locking or a hydraulic cylinder.

The resulting most favorable position for the push-pull unit is transversely in the middle of the front section of the loading platform because this will give the loading platform three-point support and make it independent of any twisting force on the chassis. At least one elastic bearing or support for the platform may be arranged next to the push-pull unit so as to dampen vibrations and noise.

A loading platform suitable for all common types of passenger cars is obtained by selecting the longitudinal dimensions such that the distance from the forwardly disposed wheel boxes to the tipping support is about 2.1 m and the length of the rear section from the tipping support is about 2.5 m. At a front length of 2.1 m even the longest passenger car to be transported still has its center of gravity within the front section.

A wider range of fields of application of the loading platform is achieved if it is designed as a continuous platform so that it will be useful also for transporting pallets and containers which can be placed on the platform from the side without any difficulty. A particularly favorable solution is obtained if the winch needed for pulling a passenger car on to the loading platform is disposed at the platform itself. The winch thus follows the tipping movement of the loading platform, whereby the cable or rope of the winch can be prevented from sliding along the loading platform, causing additional load.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views, and wherein:

FIG. 1 is a side elevational basic diagram of a loading platform according to the invention mounted on a transporter vehicle, FIG. 4 is a top elevational view of the frame skeleton of a loading platform according to the invention, including a trailer platform.

DETAILED DESCRIPTION OF THE PREFERRED EMBODIMENTS

Figure 2:
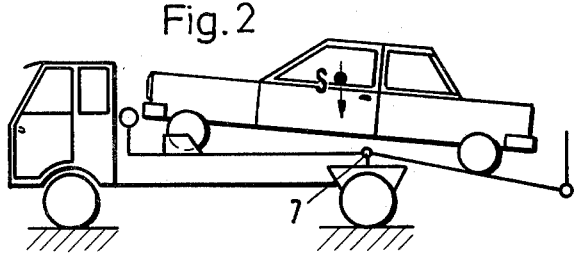
FIG. 2 and FIG. 3 are views similar to FIG. 1, at greatly reduced scale, illustrating the transportation of a longer and a shorter passenger car, respectively.

FIG. 1 shows a transporter vehicle 1 with a driver's cab 2 and a chassis 3 which is supported on a front axle 4 and a rear axle 5. A loading platform 6 is mounted on the chassis 3 and is supported at the chassis above the rear axle 5 by means of a tipping support 7 and held in front by a pressure and traction element or push-pull unit 8. The loading platform 6 projects to the rear beyond the chassis 3 and is bent at an angle α of 8° at its rear section 9 beginning at the tipping support 7. At its end the loading platform carries a tail wheel 10 at either side. Also provided at the rear end is a tiltable drive-on ramp 11 which is movable by a lifting device 12 such as an hydraulic cylinder from the elevated position shown in discontinuous lines into a downwardly tilted position, as shown in continuous lines.

Two parallel spaced wheel boxes 14 for the front wheels of a vehicle to be transported are located at the front end of the front section 13 which extends forwardly from the tipping support 7. The loading platform is extended forwardly transversely in the middle beyond the wheel boxes 14 by two central longitudinal bars 15 which carry a cable winch 16 at their ends and which are otherwise engaged by the push-pull unit 8 which may be embodied by a worm or spindle drive operable by an electric motor or by an hydraulic cylinder or the like. The spacing of the cable winch 16 from the middle of the wheel boxes corresponds to the maximum projecting length beyond the front axle of a passenger car to be transported.

The loading platform is adapted to be moved from the transportation position shown in discontinuous lines into the loading position shown in continuous lines by means of the push-pull unit 8. By virtue of the bend a small tipping angle only (about 8°) is required, and the remaining height caused by the tail wheels 10 and the frame thickness of the loading platform can be bridged by the downward tilting of the drive-on ramp 11. The tipping nature of the loading platform makes it possible to select a relatively small bend or knee angle so that when pulling up longer vehicles the bend or knee of the loading platform cannot touch the bottom group of the car to be transported. The installation of the winch on the loading platform affords the advantage that the winch will follow the tipping movement and the rope or cable 17 or the like will not slide along the loading platform, as indicated by the dash-dot line.

The spacing a of the wheel boxes 14 from the tipping support 7 is approximately 2.1 m and the length b of the rear section 9 of the loading platform is approximately 2.5 m. The location of the wheel boxes at this spacing from the tipping support permits safe transportation of all current types of passenger cars since their center of gravity will always be located between the tipping support 7 and the push-pull unit 8. Overloading of the front axle 4 is avoided because the location of the center of gravity in the range of the tipping support places the main load on the rear axle 5 of the transporter vehicle. The front axle 4 always receives positive service load and thus is not relieved, the service load, however, remains within the admissible limits.

Figure 3:
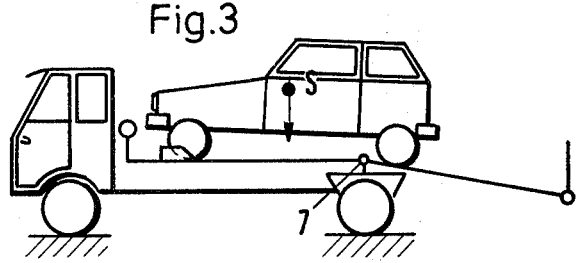

FIGS. 2 and 3 serve to illustrate the transportation of two vehicles of different lengths, the center of gravity of the loaded passenger cars being marked S. It is advantageous to arrange a damping body 18 in the form of a rubber fist 19 next to the push-pull unit 8 and so as to be engaged, in elastic deformation, by a pin 20 secured to the loading platform 6. The arrangement of the push-pull unit 8 transversely in the middle of the platform combined with the tipping support 7 establishes a three-point support of the loading platform which will thus remain uninfluenced by any torsion or twisting of the chassis of the transporter vehicle on uneven roads or for any other reason. If necessary, of course, a number of damping members may be provided.

The tipping support of the loading platform 6 makes it possible to provide a trailer coupling 21, as with stationary platforms, because the requirement of direct transfer of a trailer load onto the chassis of the traction vehicle can be readily met. In the present case it is realized by the fact that the trailer coupling 21 is connected directly to the tipping support 7. A pull bar 22 reinforced by support bars 23 extends from the coupling pin 21 to a tube 26 supported on a rocker shaft 27 which in turn is supported at its ends in bearing blocks 28 and also supports the loading platform 6 for tipping movement.

Figure 5:
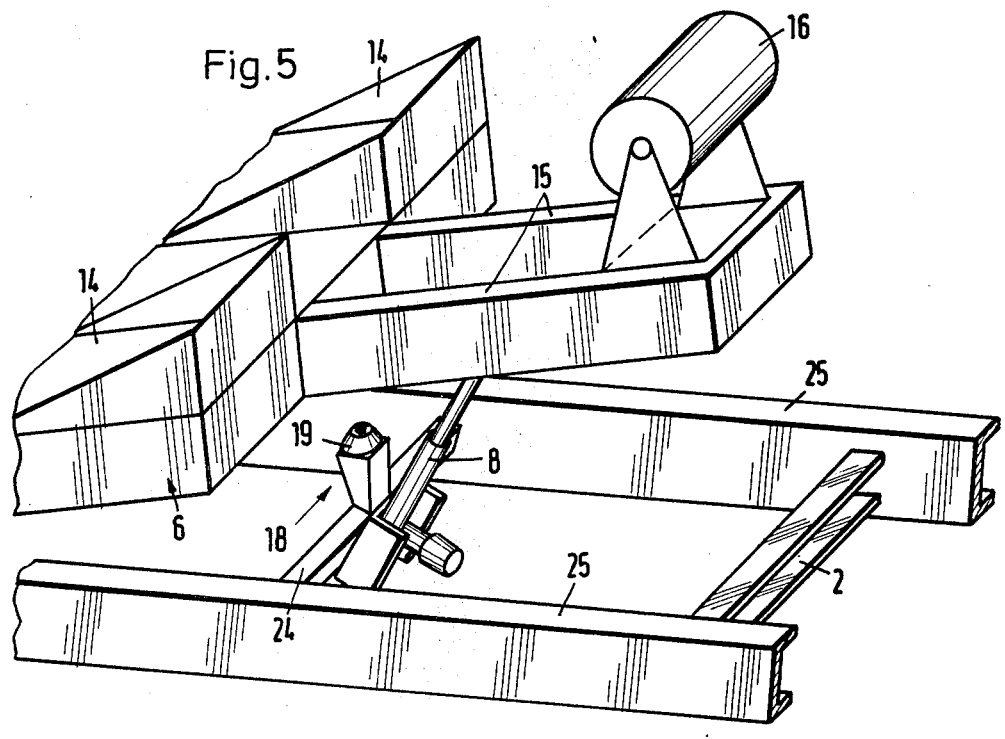
FIG. 5 is a diagrammatic view of the front support of the loading platform on the chassis of the vehicle, in a raised position.

The damping body 18 and the push-pull unit 8 are conveniently mounted on a transverse bar 24 extending between the longitudinal beams 25 of the chassis 3, as shown in FIG. 4 and in more detail in FIG. 5.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transporter vehicle for vehicles and/or containers, and including a driver cab and a rear axle comprising:

a loading platform moveable between a transportation position to a loading position, positioned behind said driver's cab including a rear section thereof projecting in a cantilevered fashion beyond said rear axle of said vehicle adapted to be lowered to the ground into said loading position for loading of said vehicles and/or containers, and a front section positioned behind and adjacent said driver's cab in said transportation position wherein said rear section is bent downward with respect to said front section at a predetermined angle;

a push-pull unit mounted on said transporter vehicle and operatively connected to said front section of said loading platform;

tipping support means mounted on said transporter vehicle substantially directly above said rear axle for supporting said rear section wherein said rear section is bent downwards towards the ground at a second angle when in said loading position and wherein said rear section is also bent downward with respect to said front section substantially directly above said rear axle;

at least one tail wheel mounted to said rear section at a rearward, free end portion thereof;

said rear section further comprising a tiltable, drive on ramp upon which said vehicles and/or containers are mountable in said loading position;

trailer coupling means directly connected to said tipping support means; and at least one stationary wheel box mounted on a front end portion of said front section wherein the length of said loading platform from a middle portion of said at least one stationary wheel box to said tipping support means is approximately 2.1 m and the length from said tipping support means to an end portion of said rear section is approximately 2.5 m.

2. The transporter vehicle as claimed in claim 1 wherein said predetermined angle comprises an angle of approximately 8°.

3. The transporter vehicle as claimed in claim 1 wherein push-pull unit is transversely mounted to on said transporter vehicle adjacent a middle portion of said loading platform.

4. The transporter vehicle as claimed in claim 3, said push-pull unit comprising electrically driven spindle drive means.

5. The transporter vehicle as claimed in claim 3, said push-pull unit comprising hydraulic cylinder means.

6. The transporter vehicle as claimed in claim 1 further comprising an elastic support means mounted on said transporter vehicle adjacent said push-pull unit.

7. The transporter vehicle as claimed in claim 6, said elastic support means comprising a rubber fist member mounted on said transporter vehicle and a pin member connected to said loading platform engaging said rubber fist member.

8. The transporter vehicle as claimed in claim 1, said loading platform further comprises an extension portion extended forwardly in the middle portion thereof beyond said at least one wheel box and further comprising winch means mounted on said extension for pulling said vehicles and/or containers onto said loading platform.

9. The transporter vehicle as claimed in claim 1, said loading platform comprising a continuous loading surface.

* * * * *